US012010103B2

United States Patent
de-Gregorio-Rodriguez et al.

(10) Patent No.: US 12,010,103 B2
(45) Date of Patent: Jun. 11, 2024

(54) SYSTEMS AND METHODS FOR HANDLING TELESCOPIC FQDNs

(71) Applicant: Telefonaktiebolaget LM Ericsson (publ), Stockholm (SE)

(72) Inventors: Jesus-Angel de-Gregorio-Rodriguez, Madrid (ES); David Castellanos Zamora, Madrid (ES); Juha Kujanen, Keuruu (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 287 days.

(21) Appl. No.: 17/602,112

(22) PCT Filed: Apr. 7, 2020

(86) PCT No.: PCT/EP2020/059921
§ 371 (c)(1),
(2) Date: Oct. 7, 2021

(87) PCT Pub. No.: WO2020/208033
PCT Pub. Date: Oct. 15, 2020

(65) Prior Publication Data
US 2022/0200966 A1    Jun. 23, 2022

Related U.S. Application Data

(60) Provisional application No. 62/830,999, filed on Apr. 8, 2019.

(51) Int. Cl.
*G06F 21/00* (2013.01)
*H04L 9/40* (2022.01)
(Continued)

(52) U.S. Cl.
CPC ...... *H04L 63/0281* (2013.01); *H04L 61/4511* (2022.05); *H04L 63/0807* (2013.01); *H04W 84/042* (2013.01)

(58) Field of Classification Search
CPC ............. H04L 63/0281; H04L 61/4511; H04L 63/0807; H04L 2101/35; H04L 61/301;
(Continued)

(56) References Cited

U.S. PATENT DOCUMENTS

2010/0186079 A1* 7/2010 Nice .................... H04L 61/4511
726/14
2017/0012956 A1   1/2017 Lee et al.
(Continued)

FOREIGN PATENT DOCUMENTS

CA    2999574 A1    9/2018
CN    104919831 A   9/2015
(Continued)

OTHER PUBLICATIONS

Author Unkown, "Technical Specification Group Services and System Aspects; Security Aspects; Study on security aspects of the 5G Service Based Architecture (SBA) (Release 16)," Technical Report 33.855, Version 1.4.0, 3GPP Organizational Partners, Mar. 2019, 57 pages.
(Continued)

*Primary Examiner* — Michael M Lee
(74) *Attorney, Agent, or Firm* — Withrow & Terranova, PLLC (57) ABSTRACT

A method performed by a first node implementing a first NF in a visited network (VPLMN) for communicating with a third node implementing a second NF in a home network (HPLMN) is provided. Embodiments include: determining that the third node should be communicated with; sending, towards a second node implementing a Security Edge Protection Proxy (SEPP) in the visited network, a request for a telescopic FQDN for the third node in the home network to be used by the first node in the visited network to communicate with the third node in the home network, which
(Continued)

request comprises a FQDN of the third node in the home network; receiving, from the second node, a telescopic FQDN for the third node wherein the FQDN for the third node in the home network is flattened to a single label to be used by the first node to communicate with the third node.

10 Claims, 8 Drawing Sheets

(51) Int. Cl.
  *H04L 61/4511* (2022.01)
  *H04W 84/04* (2009.01)
(58) Field of Classification Search
  CPC ... H04W 84/042; H04W 12/084; H04W 8/12; H04W 88/16
  See application file for complete search history.

(56) References Cited

U.S. PATENT DOCUMENTS

| | | | |
|---|---|---|---|
| 2018/0077614 | A1 | 3/2018 | Vikberg et al. |
| 2019/0260803 | A1* | 8/2019 | Bykampadi ........... H04W 12/10 |
| 2020/0036754 | A1* | 1/2020 | Livanos ................ H04W 48/16 |
| 2020/0260525 | A1 | 8/2020 | Gan et al. |
| 2021/0044569 | A1* | 2/2021 | Xu ....................... H04L 67/564 |
| 2021/0120416 | A1* | 4/2021 | S Bykampadi ..... H04L 63/0281 |

FOREIGN PATENT DOCUMENTS

| | | |
|---|---|---|
| CN | 108702679 A | 10/2018 |
| WO | 2020094914 A1 | 5/2020 |

OTHER PUBLICATIONS

Author Unkown, "Technical Specification Group Core Network and Terminals; Numbering, addressing and identification (Release 15)," Technical Specification 23.003, Version 15.6.0, 3GPP Organizational Partners, Dec. 2018, 130 pages.
Author Unkown, "Technical Specification Group Core Network and Terminals; 5G System; Network Function Repository Services; Stage 3 (Release 15)," Technical Specification 29.510, Version 15.3.0, 3GPP Organizational Partners, Mar. 2019, 121 pages.
Author Unkown, "Technical Specification Group Core Network and Terminals; 5G System; Public Land Mobile Network (PLMN) Interconnection; Stage 3 (Release 15)," Technical Specification 29.573, Version 15.1.0, 3GPP Organizational Partners, Dec. 2018, 57 pages.
Author Unkown, "Technical Specification Group Services and System Aspects; Security architecture and procedures for 5G system (Release 15)," Technical Specification 33.501, Version 15.4.0, 3GPP Organizational Partners, Mar. 2019, 187 pages.
Ericsson, "C4-192201: Discussion Paper: Handling of Telescopic FQDNs," Third Generation Partnership Project (3GPP), TSG-CT WG3 Meeting #91, May 13-17, 2019, 2 pages, Reno, USA.
Ericsson, "C4-193728: Telescopic FQDN Mapping Service," Third Generation Partnership Project (3GPP), TSG-CT WG4 Meeting #93, Aug. 26-30, 2019, 9 pages, Wroclaw, Poland.
Nokia, et al., "S3-183546: Issue with wildcard certificates," Third Generation Partnership Project (3GPP), TSG SA WG3 (Security) Meeting #93, Nov. 12-16, 2018, 2 pages, Spokane, US.
International Search Report and Written Opinion for International Patent Application No. PCT/EP2020/059921, dated Sep. 3, 2020, 10 pages.
International Preliminary Report on Patentability for International Patent Application No. PCT/EP2020/059921, dated Jul. 1, 2021, 13 pages.
Intention to Grant for European Patent Application No. 20723788.4, dated Mar. 3, 2021, 5 pages.
Extended European Search Report for European Patent Application No. 21175116.9, dated Aug. 12, 2021, 8 pages.
Examination Report for Indian Patent Application No. 202147050500, dated Mar. 23, 2022, 5 pages.
Ericsson, "S3-183723: New option to Solution #8 Inter PLMN routing and TLS," 3GPP TSG SA WG3 Meeting #93, Nov. 12-16, 2018, Spokane, Washington, 4 pages.
Ericsson, "S3-190089: Editorials and minor clarifications for clause 13.1," 3GPP TSG-SA WG3 Meeting #94, Jan. 28-Feb. 1, 2019, Kochi, India, 3 pages.
SA3, "C4-187308: Reply LS to LS Out on TLS and inter PLMN routing," 3GPP TSG CT WG4 Meeting #86bis, Oct. 15-19, 2018, Vilnius, Lithuania, 2 pages.
Notice of Reasons for Rejection for Japanese Patent Application No. 2021-559546, dated Nov. 22, 2022, 6 pages.
Ericsson, et al., "S2-188530: Storing FQDN for S5/S8 interface of the PGW-C+SMF in UDM," 3GPP TSG-SA WG2 Meeting #128bis, Aug. 20-24, 2018, Sophia Antipolis, France, 17 pages.
Office Action for Chinese Patent Application No. 202080026091.X, dated Apr. 26, 2023, 7 pages.
Examination Report for European Patent Application No. 21175116. 9, dated Jan. 19, 2023, 4 pages.

* cited by examiner

SYSTEMS AND METHODS FOR HANDLING TELESCOPIC FQDNs

This application is a 35 U.S.C. § 371 national phase filing of International Application No. PCT/EP2020/059921, filed Apr. 7, 2020, which claims the benefit of U.S. Provisional Application No. 62/830,999, filed Apr. 8, 2019, the disclosures of which are incorporated herein by reference in their entireties.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

In the 5G system, for roaming scenarios, a Network Function (NF) in the visited PLMN needs to interact with Network Functions in a home PLMN. Such signaling interaction must traverse a border entity called SEPP (Security Edge Protection Proxy), located in the edge of both PLMNs.

The security requirements of the signaling typically impose the requirement to protect via TLS (Transport Layer Security) the signaling between NFs, even inside a given PLMN. Therefore, the URIs (Uniform Resource Identifier) used by the visited NF to address a given NF in the home PLMN are usually "https" URIs. E.g. an AMF (vPLMN) interacting with UDM (hPLMN) could use the following URI:

https://udm1.home-operatorcom/nudsm-sdm/v1/ . . .

At the same time, the SEPP located in the visited PLMN needs to be able to access the contents of the message, in clear text, to apply a certain business logic.

However, using TLS (https) requires the message to be encrypted end-to-end, making it impossible for the SEPP to get access to the message.

To solve this, the concept of "Telescopic Fully Qualified Domain Name (FQDN)" was introduced in TS 33.501, with the goal to terminate the TLS connection at the visited SEPP. The example URI above would be transformed into:

https://udm1.home-operator.com.sepp.visited-operator.com (That is, in this telescopic FQDN the FQDN of the home UDM is concatenated with the FQDN of the visited SEPP.)

The DNS of the visited PLMN is configured in such a way that any address ending in " . . . sepp.visited-operator.com" would be resolved to the IP address of the visited SEPP.

There is an additional issue to take into account: the visited SEPP, in order to terminate the TLS connection, needs to present a valid Public Key Infrastructure (PKI) Certificate to the visited NF (originator of the TLS connection). The certificate is "valid", when the target URI "matches" the FQDN, or FQDNs, found in the certificate, in the Subject Alternative Name field.

Given that the telescopic FQDN is dynamically built, and given that the first part is the FQDN of the visited NF, it is not possible to create a certificate with such an FQDN inside the certificate. The solution is to create a "wildcard certificate". E.g. in the example above, the wildcard certificate would contain the Subject Alternative Name as:

.sepp.visited-operator.com

An important limitation of wildcard certificates is that the "*" can only represent a single-level domain in the FQDN. Therefore the above example would match:

node1.sepp.visited-operator.com

But the above example would NOT match the telescopic FQDN, in its general multi-level form:

udm1.home-operator.com.sepp.visited-operator.com

The consequence is that the telescopic FQDN must be transformed, once again, in such a way that the FQDN of the NF in the home PLMN is "flattened" into a single label, e.g.

udm1.home-operator.com->label and then, the final URI would be in the form of:

https://label.sepp.visited-operator.com which would match successfully when the visited SEPP presents to the visited NF a wildcard certificate as shown above (*.sepp.visited-operator.com).

SUMMARY

There currently exist certain challenge(s). As mentioned above, Telescopic Fully Qualified Domain Name (FQDN)" was introduced in TS 33.501. However, it is stated in TS 33.501 that the algorithm for generating such a single label, from the FQDN of the home NF, is left for CT4 to define.

However, CT4 has never done it, for the following reason:

An NF in the visited PLMN typically gets the FQDN of the NF in the home PLMN via the Discovery Service Request of the NRF. This means that the messages of the Discovery Service Request also go through the SEPP, and therefore the visited SEPP can create the telescopic FQDN of the discovered NFs of the home PLMN before sending the Discovery Service Response to the visited NF. At this point, the visited SEPP can apply any proprietary algorithm it chooses, to generate the "single label" domain required for the telescopic FQDN.

Then, the visited NF will use such telescopic FQDN built by the visited SEPP in order to send the actual "service" request (e.g. the AMF sends the service request to the discovered UDM).

The request is received by the visited SEPP and it must do the reverse transformation of the telescopic FQDN into the original FQDN of the home NF. E.g.

https://label.sepp.visited-operator.com->https://udm1.home-operator.com

Given that the SEPP created the "label" from "udm1.home-operator.com", it can always transform it back into the original FQDN "udm1.home-operator.com" (either applying an algorithmic transformation, or by keeping a mapping table between labels and FQDNs).

The problem with the above assumption is that there are cases where the SEPP may not have been previously involved in the signaling path, and the visited NF needs to interact with a home NF. Such scenarios are cases when the "Visited NF" and the "Home NF" mentioned so far are, in fact, a "visited NRF" and a "home NRF". In particular:

Visited NRF sends a discovery request to the Home NRF

Visited NRF sends an Oauth2 Access Token request to the Home NRF

Visited NRF sends a subscription request to the Home NRF

In all those cases, the Visited NRF learns the FQDN of the Home NRF, either by means of:
- a standardized well-known address defined in TS 23.003 (constructed based on the MCC/MNC of the home PLMN), or
- configured in the visited PLMN as part of the SLA/roaming agreements with the home PLMN Therefore, in those cases, the visited NRF must compose a telescopic FQDN of the home NRF that points to the visited SEPP. E.g.:

https://nrf.home-operator.com.sepp.visited-operator.com

And this needs to be transformed into a single-label domain, such as:

https://label.sepp.visited-operator.com

Therefore, there is a need for improved systems and methods for the visited SEPP to do the reverse transform, and convert "label" into "nrf.home-operator.com", given that the original transform was done in another entity (visited NRF).

Certain aspects of the present disclosure and their embodiments may provide solutions to the aforementioned or other challenges. The present disclosure proposes a new service offered by SEPP, so other NFs may request the SEPP to generate a telescopic FQDN (and flatten the original FQDN into a single label), and also to do the reverse mapping, converting the flattened telescopic FQDN into the original FQDN of the NF in the home PLMN.

E.g.: Visited NRF needs to contact:
https://nrf.home-operator.com

So, it sends a GET request to the visited SEPP, like this:
GET https://sepp.visited-operatorcom/telescopic?fqdn="nrf.home-operator.com", wherein "sepp.visited-operator.com" is the FQDN of the visited SEPP and "nrf.home-operator.com" is the FQDN of the home NRF.

And the visited SEPP would answer, e.g., with a JSON document like this:
{"telescopic": "0x1273bc89.sepp.visited-operatorcom"}
(That is, in this telescopic FQDN "0x1273bc89.sepp.visited-operator.com" the FQDN of the home NRF has been flattened to the label "0x1273bc89", which is concatenated with the FQDN of the visited SEPP, i.e. "sepp.visited-operator.com".)

A reverse service could also be offered:
GET https://sepp.visited-operatorcom/telescopic?label="0x1273bc89"

And the visited SEPP would answer, e.g.:
{"fqdn": "nrf.home-operator.com"}

A mechanism and associated services offered by the SEPP, allowing other NFs to obtain telescopic FQDNs of NFs in another PLMN, in such a way that, later, the SEPP can do the reverse mapping and obtain the FQDN of the foreign NF based on the telescopic FQDN.

There are, proposed herein, various embodiments which address one or more of the issues disclosed herein. In some embodiments, a method performed by a first node for communicating with a third node includes: determining that the third node should be communicated with; requesting, from a second node, an address to use to communicate with the third node; receiving, from the second node, the address to use to communicate with the third node; and communicating with the third node using the address.

In some embodiments, one or more of the following: the first node is a node in a visited network such as a visited NRF; the second node is a node in the visited network such as a visited SEPP; and the third node is a node in a home network such as a home NRF.

In some embodiments, requesting the address to use to communicate with the third node comprises requesting a telescopic FQDN for the third node. In some embodiments, receiving the address to use to communicate with the third node comprises receiving a telescopic FQDN for the third node. In some embodiments, requesting the address to use to communicate with the third node comprises sending a FQDN for the third node. In some embodiments, receiving the address to use to communicate with the third node comprises receiving a flattened FQDN for the third node.

In some embodiments, the method also includes communicating with the third node by sending a service request to the second node using the address to use to communicate with the third node. In some embodiments, the method also includes communicating with the third node by sending a service request to another node using the address to use to communicate with the third node.

In some embodiments, a method performed by a second node for enabling communication with a third node includes: receiving, from a first node, a request for an address to use to communicate with the third node; and transmitting, to the first node, the address to use to communicate with the third node.

In some embodiments, one or more of the following: the first node is a node in a visited network such as a visited NRF; the second node is a node in the visited network such as a visited SEPP; and the third node is a node in a home network such as a home NRF. In some embodiments, receiving the request for the address to use to communicate with the third node comprises receiving a request for a telescopic FQDN for the third node. In some embodiments, transmitting the address to use to communicate with the third node comprises transmitting a telescopic FQDN for the third node. In some embodiments, receiving the request for the address to use to communicate with the third node comprises receiving a FQDN for the third node. In some embodiments, transmitting the address to use to communicate with the third node comprises transmitting a flattened FQDN for the third node.

In some embodiments, the method also includes receiving a service request, from the first node, for communicating with the third node using the address to use to communicate with the third node.

In particular, one embodiment is directed to a method performed by a first node implementing a first Network Function (NF) in a visited network (e.g. a Visited Public Land Mobile Network, VPLMN) for communicating with a third node implementing a second NF in a home network (e.g. a Home Public Land Mobile Network, HPLMN), the method comprises: determining that the third node should be communicated with; sending towards a second node implementing a Security Edge Protection Proxy (SEPP) in the visited network, a request for a telescopic Fully Qualified Domain Name (FQDN) for the third node in the home network to be used by the first node in the visited network to communicate with the third node in the home network, which request comprises a FQDN of the third node in the home network (e.g. the FQDN "nrf.home-operator.com"); receiving, from the second node, a telescopic FQDN for the third node wherein the FQDN for the third node in the home network is flattened to a single label to be used by the first node to communicate with the third node. Preferably, the received telescopic FQDN comprises the FQDN of the third node flattened to a label that is concatenated with the FQDN of the second node. For example, the received telescopic FQDN may be "0x1273bc89.sepp.visited-operator.com", wherein the third node is a home NRF with the FQDN "nrf.home-operator.com" that has been flattened to the label "0x1273bc89", and wherein the second node is a visited SEPP with the FQDN "sepp.visited-operator.com".

One other embodiment is directed to a method performed by a second node implementing a Security Edge Protection Proxy (SEPP) in a visited network (e.g. a Visited Public Land Mobile Network, VPLMN) for enabling communication with a third node implementing a second Network Function (NF) in a home network (e.g. a Home Public Land Mobile Network, HPLMN), the method comprises: receiving, from a first node implementing a first NF in the visited network, a request for a telescopic Fully Qualified Domain Name, FQDN, for the third node in the home network to be used by the first node in the visited network to communicate with the third node in the home network, which request comprises a FQDN of the third node in the home network; and transmitting, to the first node, a telescopic FQDN for the third node wherein the FQDN for the third node in the home network is flattened to a single label to be used by the first node to communicate with the third node.

Certain embodiments may provide one or more of the following technical advantage(s). The solution provides a lot of flexibility and eases the inter-operability in the generation and handling of the telescopic FQDNs.

Other suggested approaches to solve this problem relied on very rudimentary algorithmic transformation of the original telescopic FQDN, e.g. by replacing the "." in the original FQDN of the visited NF, with the symbol "-", to create a single label like:

nrf.operator.com->nrf-operator-com

So, the telescopic FQDN would be:

nrf-operator-com.sepp.visited-operator.com

This is really an ugly and inflexible solution, because FQDNs such as the example used repeatedly in this current disclosure:

nrf.home-operatorcom would not be possible to be transformed with such algorithm, due to the presence of "-" in the original FQDN. It should be noted that the only non-alphabetic symbol allowed in FQDNs is the "-" symbol, so no other symbol can be used to replace "."

It was also suggested to overcome this problem by replacing "-" itself with multiple "-" symbols, but again, this is extremely ugly and inflexible (e.g. internationalized domain names often contain 2 consecutive "-" symbols).

Also, another limitation of an algorithmic transformation is that the total length of any given label cannot exceed 63 characters, so for long domain names involving multiple domain levels, the upper limit in length can be easily reached.

Another approach mentioned to solve this problem has been to configure the telescopic FQDN for the Home NRF at the Visited NRF. This is also a very inefficient and cumbersome type of solution as configuration shall involve the Home NRFs in each and every HPLMN a given PLMN has roaming agreements with. Furthermore, this configuration is not only required at the Visited NRF but also at the Visited SEPP as the Visited SEPP needs to be able to map the telescopic FQDN for a Home NRF to the FQDN of the original Home NRF.

BRIEF DESCRIPTION OF THE DRAWINGS

The proposed solutions are now described, by way of example, with reference to the accompanying drawings, in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF) or the like, e.g. such as any of the core network nodes illustrated in FIGS. 2 and 3A-3B.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 1:
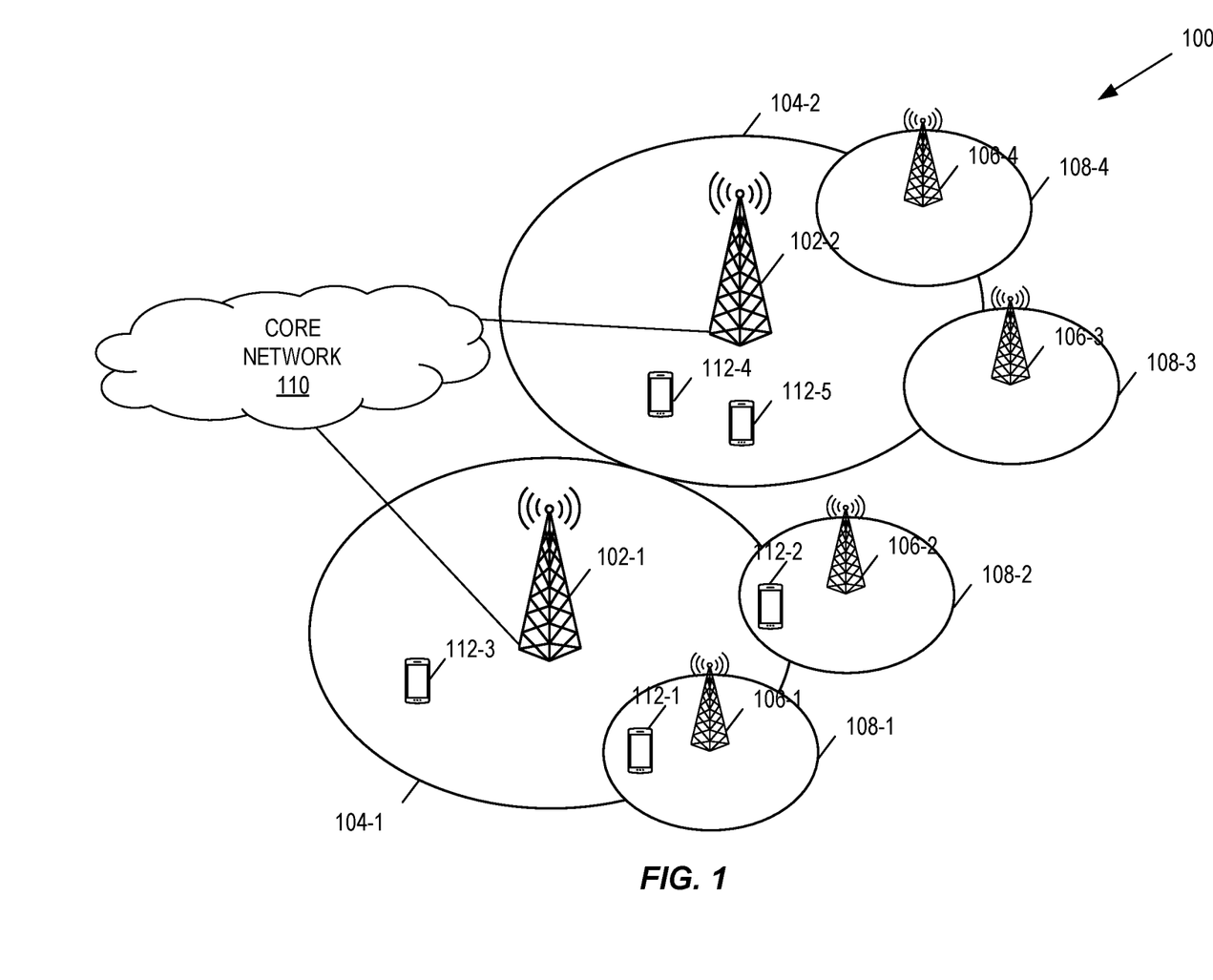
FIG. 1 illustrates one example of a cellular communications network 100 according to some embodiments of the present disclosure.

FIG. 1

FIG. 1 illustrates one example of a cellular communications network 100 according to some embodiments of the present disclosure. In the embodiments described herein, the cellular communications network 100 is a 5G NR network. In this example, the cellular communications network 100 includes base stations 102-1 and 102-2, which in LTE are referred to as eNBs and in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

Figure 2:
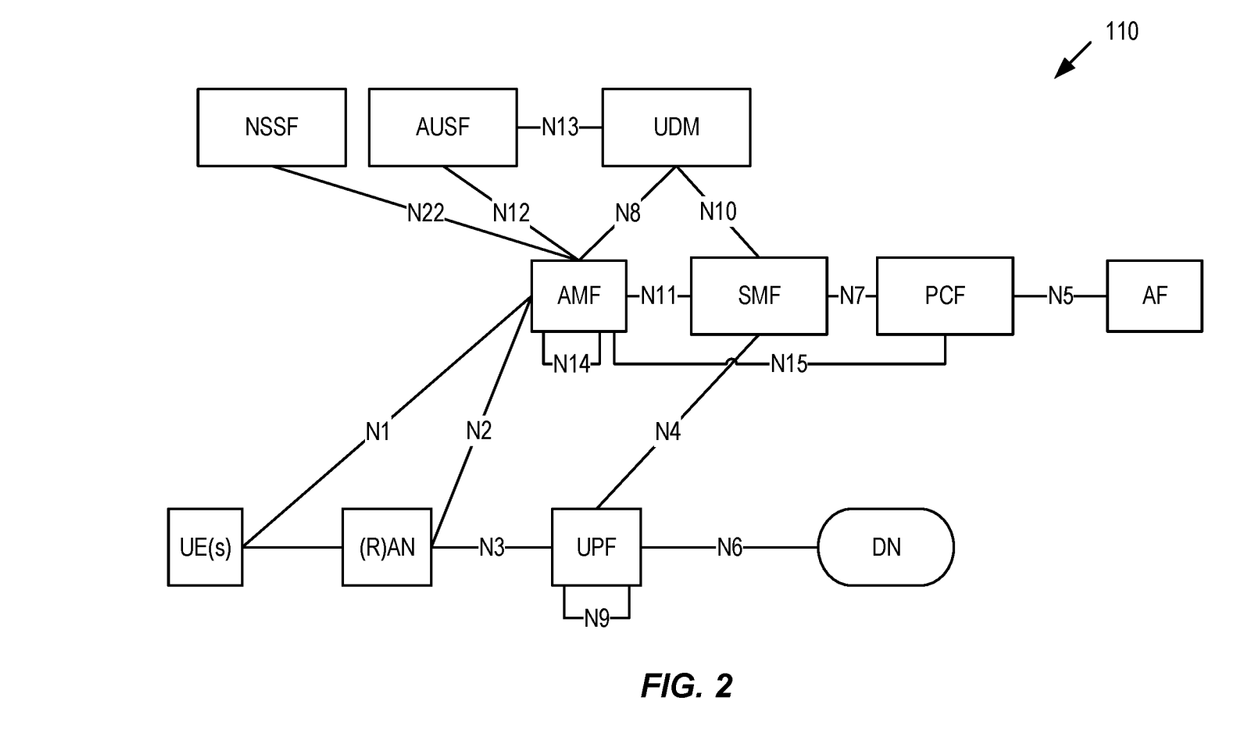
FIG. 2 illustrates a wireless communication system represented as a 5G network architecture.

FIG. 2

FIG. 2 illustrates a wireless communication system represented as a 5G network architecture composed of core Network Functions (NFs), where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of User Equipment (UEs) connected to either a Radio Access Network (RAN) or an Access Network (AN) as well as an Access and Mobility Management Function (AMF). Typically, the R(AN) comprises base stations, e.g. such as evolved Node Bs (eNBs) or 5G base stations (gNBs) or similar. Seen from the core network side, the 5G core NFs shown in FIG. 2 include such core network nodes as a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 2, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 3A:
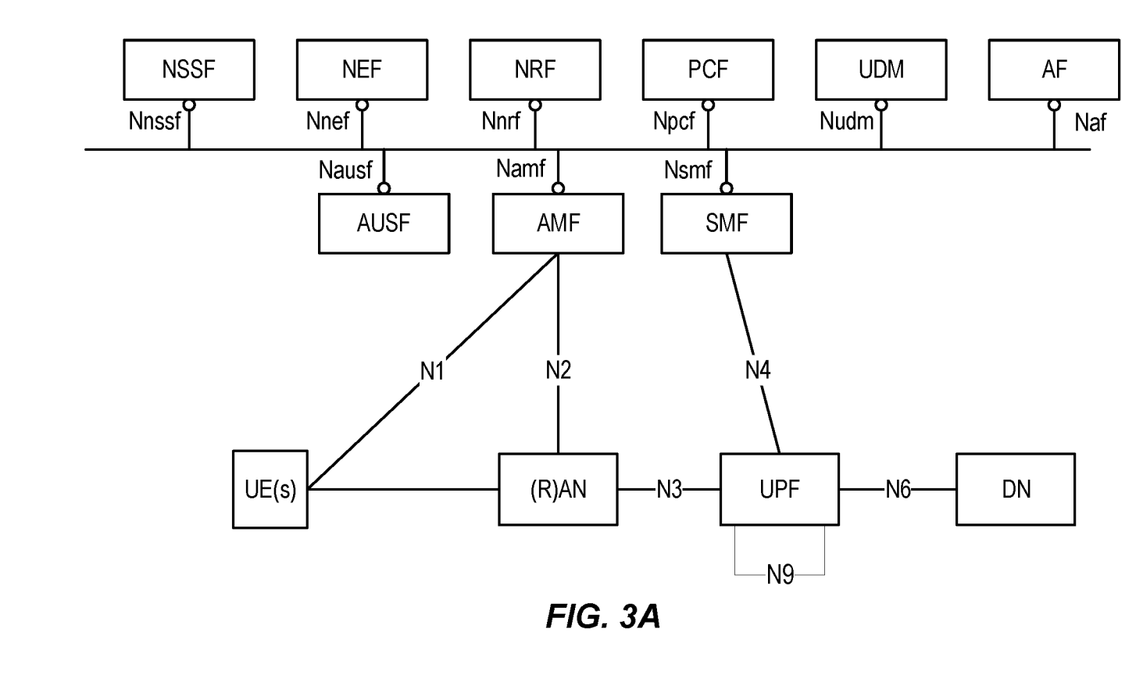
FIG. 3A illustrates a wireless communication system represented as a 5G network architecture.

FIG. 3A

FIG. 3A illustrates a 5G network architecture using service-based interfaces between the NFs in the control plane, instead of the point-to-point reference points/interfaces used in the 5G network architecture of FIG. 2. However, the NFs described above with reference to FIG. 2 correspond to the NFs shown in FIG. 3A. The service(s) etc. that a NF provides to other authorized NFs can be exposed to the authorized NFs through the service-based interface. In FIG. 3A the service based interfaces are indicated by the letter "N" followed by the name of the NF, e.g. Namf for the service based interface of the AMF and Nsmf for the service based interface of the SMF etc. The Network Exposure Function (NEF) and the Network Repository Function (NRF) in FIG. 3A are not shown in FIG. 2 discussed above. However, it should be clarified that all NFs depicted in FIG. 2 can interact with the NEF and the NRF of FIG. 3A as necessary, though not explicitly indicated in FIG. 2.

Some properties of the NFs shown in FIGS. 2 and 3A may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

The UDM is similar to the HSS in LTE/EPC networks discussed above. UDM supports Generation of 3GPP AKA authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

Figure 3B:
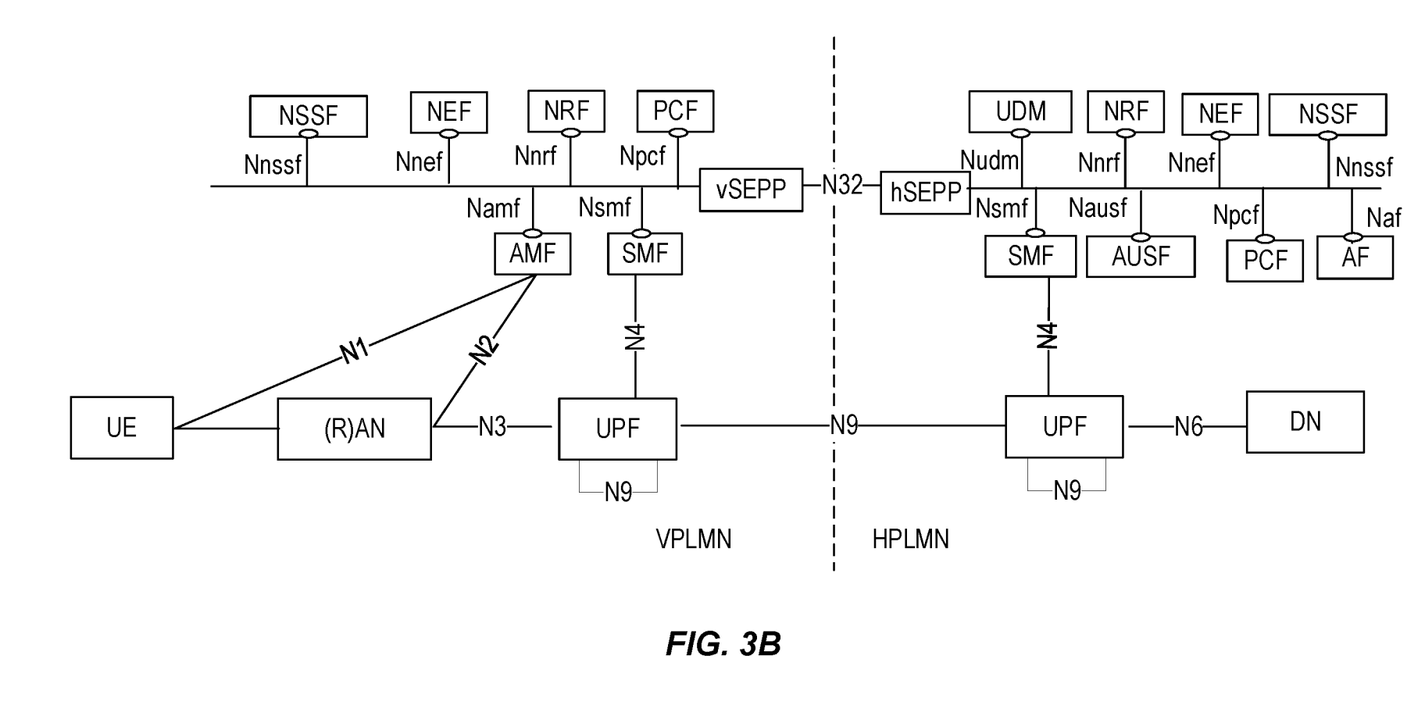
FIG. 3B shows an exemplary roaming 5G reference architecture with service-based interfaces, wherein some embodiments of the present disclosure may be implemented.

FIG. 3B

FIG. 3B shows an exemplary roaming 5G reference architecture with service-based interfaces. In this reference architecture, the user roams into a Visited Public Land Mobile Network (VPLMN) that is different than the user's Home PLMN (HPLMN). In particular, FIG. 3B shows a roaming architecture that supports home-routed data services, in which the home operators administrative domain is involved in the user's data session and the UE interfaces the data network (DN) in the HPLMN. From the users perspective, the various network functions of the HPLMN shown in the non-roaming architecture of FIG. 3A are distributed among the HPLMN and VPLMN in the home-routed roaming architecture shown in FIG. 3B. For example, the AMF is in the VPLMN, the AUSF is in the HPLMN, and the SMF and UPF exist in both (e.g., are split between) VPLMN and HPLMN. To distinguish between these functions existing in both networks, a prefix of "H" or "V" can be used, such as "H-UPF" and "V-UPF".

In both roaming and non-roaming scenarios, a user (e.g., a UE) may want to establish a data session (also referred to as a "PDU session") with a data network (DN, e.g., Internet) via the 5G network. The term "PDU", short for "protocol data unit," is often used to refer to a unit of data specified in a protocol layer and comprising protocol control information and possibly user data. "PDU" is often used interchangeably with "packet." A PDU Session establishment may correspond to any of the following:

a UE initiated PDU Session Establishment procedure;
a UE initiated PDU Session handover between 3GPP and non-3GPP networks;
a UE initiated PDU Session handover from LTE to NR (e.g., EPC to 5GC); and a network-triggered PDU Session Establishment procedure. In this case the network sends the device trigger message to application(s) on the UE side. The payload included in Device Trigger Request message contains information on which application on the UE side is expected to trigger the PDU Session establishment request. Based on that information, the application(s) on the UE side trigger the PDU Session Establishment procedure.

For a UE-initiated (or UE-requested) PDU session establishment based on home-routed roaming, functions in the VPLMN often need to exchange information about the user with their peer and/or corresponding function in the HPLMN. For example, the V-SMF often needs to exchange information with the H-SMF. However, various problems and/or difficulties can arise due to the VPLMN function (e.g., V-SMF) lacking necessary information about the corresponding HPLMN function (e.g., H-SMF).

An NF may be implemented either as a network element on a dedicated hardware, as a software instance running on a dedicated hardware, or as a virtualized function instantiated on an appropriate platform, e.g., a cloud infrastructure. The NF may be a NF instance.

Figure 4:
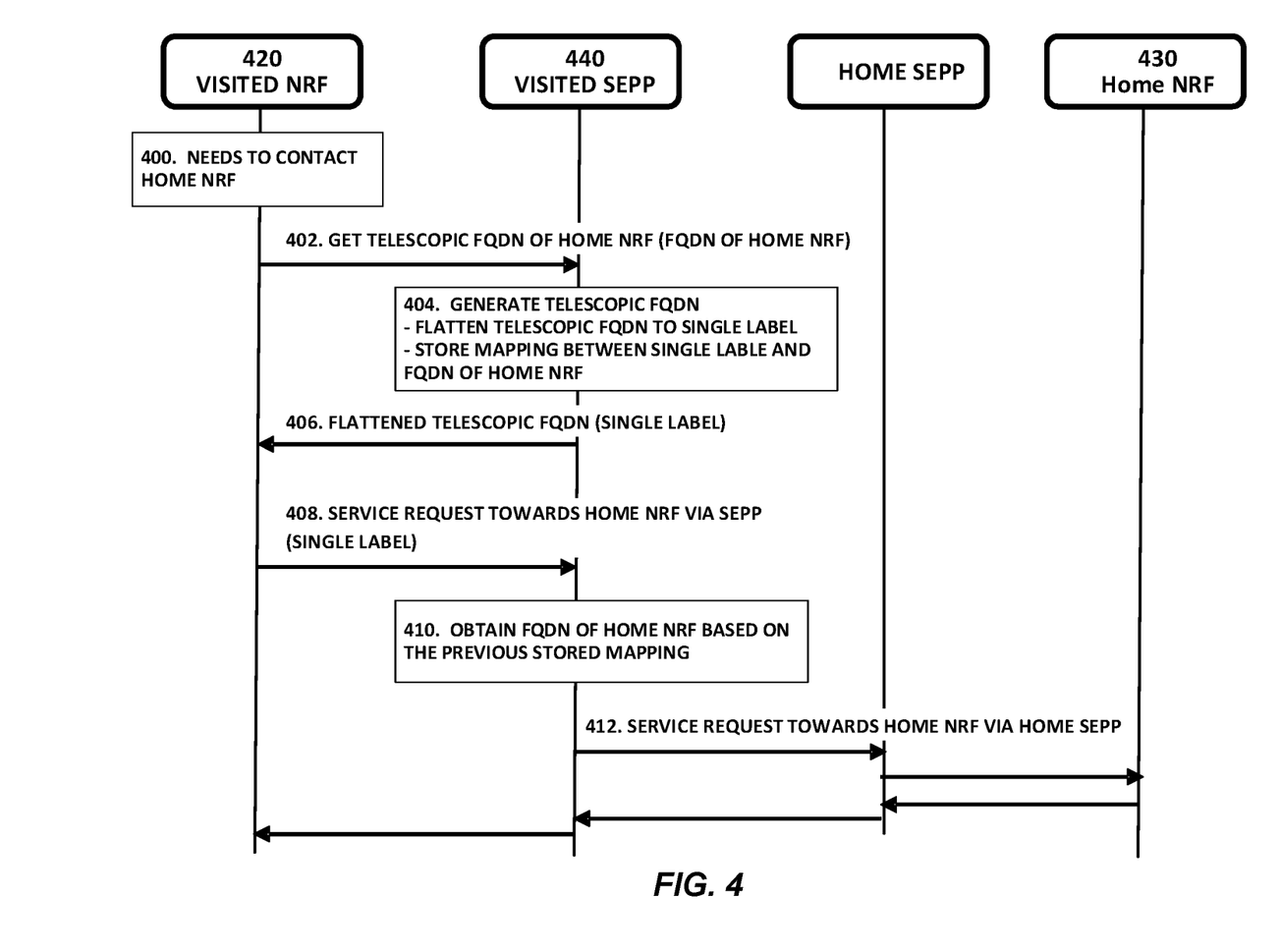
FIG. 4 shows an example of some embodiments of the current disclosure.

FIG. 4

FIG. 4 shows an example of some embodiments of the current disclosure. Visited NRF (e.g. a NRF instance) needs to send a message (service request) to Home NRF (e.g. a NRF instance) (step 400). Use cases may be:
Discovery Request
Oauth2 Access Token Request
Subscription to Home NRF to be notified about events of NFs registered in Home NRF
The FQDN of the Home NRF may be determined by the visited NRF as:
Standard FQDN constructed from MCC/MNC of the home PLMN
Locally configured, from roaming agreements between home/visited PLMNs Visited NRF sends, before sending a service request to the Home NRF, a request to visited SEPP to obtain a telescopic FQDN for the Home NRF's FQDN (step 402). For example, the visited NRF may send a GET request to the visited SEPP, like: GET https://sepp.visited-operatorcom/ telescopic?fqdn="nrf.home-operator.com, wherein "sepp.visited-operator.com" is the FQDN of the visited SEPP, and "nrf.home-operator.com" is the FQDN of the home NRF. The address/ID of the visited SEPP (e.g. sepp.visited-operator.com) can be locally configured in the visited NRF unless Visited SEPPs offering this new service register themselves in the Visited NRF as any other NF within the 5GC in which case, the visited NF may do a service discovery with respect to the visited NRF to discover a service offered by the visited SEPP.

Visited SEPP creates the telescopic FQDN (step 404), e.g. by generating a random label (e.g. having only letters, digits and possibly the "-" symbol) and appending it to it the FQDN of the visited SEPP, for example in a JSON document like this:

{"telescopic": "0x1273bc89.sepp.visited-operator.com"}.
Here, the exemplifying random label is "0x1273bc89". The telescopic FQDN for the Home NRF is returned to the visited NRF (step 406), wherein the FQDN for the Home NRF is flattened to a single label.

The visited NRF sends the service request (step 408) (discovery, token request, subscription . . . ) using the flattened telescopic FQDN, e.g. by concatenating the flattened telescopic FQDN and the FQDN of the visited SEPP, which effectively points to an IP address of the visited SEPP, and therefore, the SEPP can terminate the TLS connection and exhibit a valid wildcard certificate. Given that the TLS is terminated at the visited SEPP, it can decrypt the message (service request) and proceed with the necessary modifications before sending it externally towards another PLMN.

The visited SEPP checks the mapping table and obtains the actual FQDN of the home NRF (step 410), based on the telescopic FQDN (flattened to single-label) sent by the visited NRF.

The visited SEPP routes the message to the home PLMN (step 412), effectively sending the message towards the home SEPP, and potentially traversing additional intermediaries in the IPX. The rest of the flow is outside the scope of this disclosure.

An additional embodiment proposes the possibility that the Visited SEPP exposing the new service to generate a telescopic FQDN to other NFs is different from the Visited SEPP through which the NF will send the actual service request; i.e. the Visited SEPP used in step 402 and step 408 in FIG. 4 are different Visited SEPP instances. This is illustrated in FIG. 5.

Figure 5:
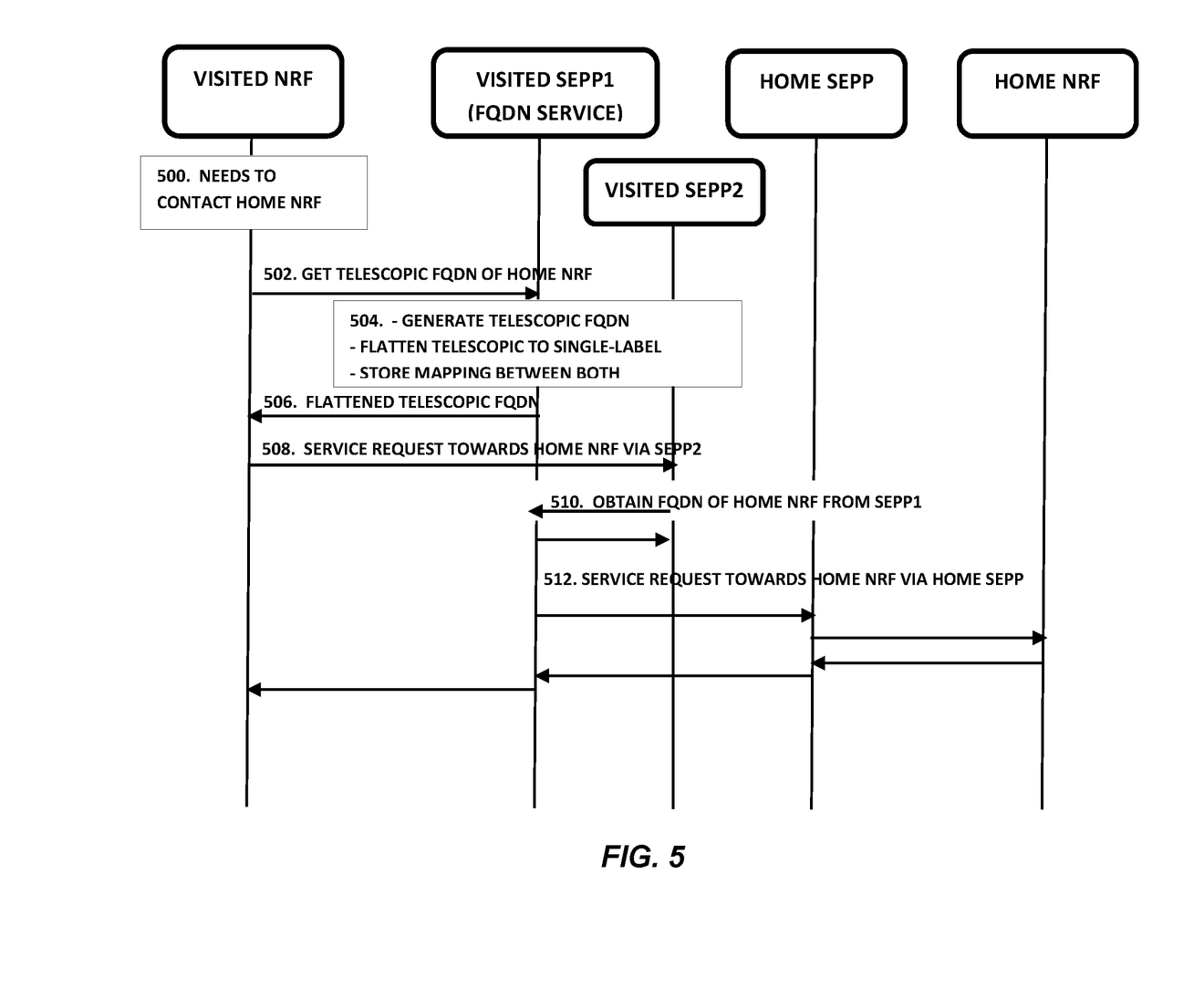
FIG. 5 shows an example of some embodiments of the current disclosure.

FIG. 5

Visited NRF gets a telescopic FQDN for the Home NRF's FQDN from one instance of the SEPP exposing this service within VPLMN, Visited SEPP1, as depicted in FIG. 4 (steps 400-406, correspond to steps 500-506 in FIG. 5 respectively).

According to some embodiments of the current disclosure, the Visited SEPP1 offering this service could select the actual visited SEPP the visited NRF should use to send the actual service request towards the HPLMN (e.g. Visited SEPP2). For this purpose, the Visited SEPP1 could generate the telescopic FQDN in the domain of SEPP2 as follows:

{"telescopic": "label.sepp2.visited-operator.com"}

The visited NRF sends the service request (step 508) (discovery, token request, subscription . . . ) to the flattened telescopic FQDN, which effectively points to an IP address of a visited SEPP. The NRF chooses a visited SEPP instance (visited SEPP 2) different from the visited SEPP instance used in step 2 above based e.g. on local configuration or based on the information within the telescopic FQDN provided by visited SEPP1.

If the visited SEPP2 does not recognize the label within the telescopic FQDN, the visited SEPP2 obtains the actual FQDN of the home NRF based on the telescopic FQDN sent by the visited NRF from the visited SEPP1 which generated it (step 510); i.e. Visited SEPP1 (e.g. "sepp1-0x1273bc89").

In this case, the visited SEPP1 also exposes a service to resolve telescopic FQDNs (i.e. to map the label to the FQDN of the Home NRF). The flow continues as described in FIG. 4 with step 512 being similar to step 412.

Figure 6:
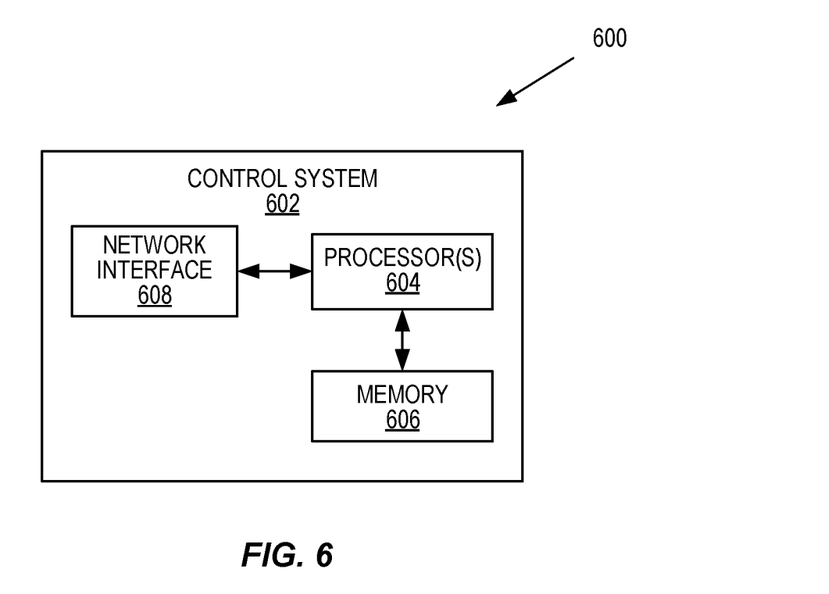
FIG. 6 is a schematic block diagram of a node 600 implementing a network function according to some embodiments of the present disclosure.

FIG. 6

FIG. 6 is a schematic block diagram of a node 600 (e.g. a core network node) implementing a network function according to some embodiments of the present disclosure. The node 600 may be, for example, a core network node e.g. such as any one of a, NEF, an AUSF, a UDM, an AMF, a SMF, a PCF, a UPF or similar and in particular an NSSF or a NRF or a SEPP or similar. As illustrated, the node 600 includes a control system 602 that includes one or more processors 604 (e.g., Central Processing Units (CPUs), Application Specific Integrated Circuits (ASICs), Field Programmable Gate Arrays (FPGAs), and/or the like), memory 606, and a network interface 608. The one or more processors 604 are also referred to herein as processing circuitry. The one or more processors 604 operate to provide one or more functions of a node 600 as described herein. In some embodiments, the function(s) are implemented in software that is stored, e.g., in the memory 606 and executed by the one or more processors 604.

Figure 7:
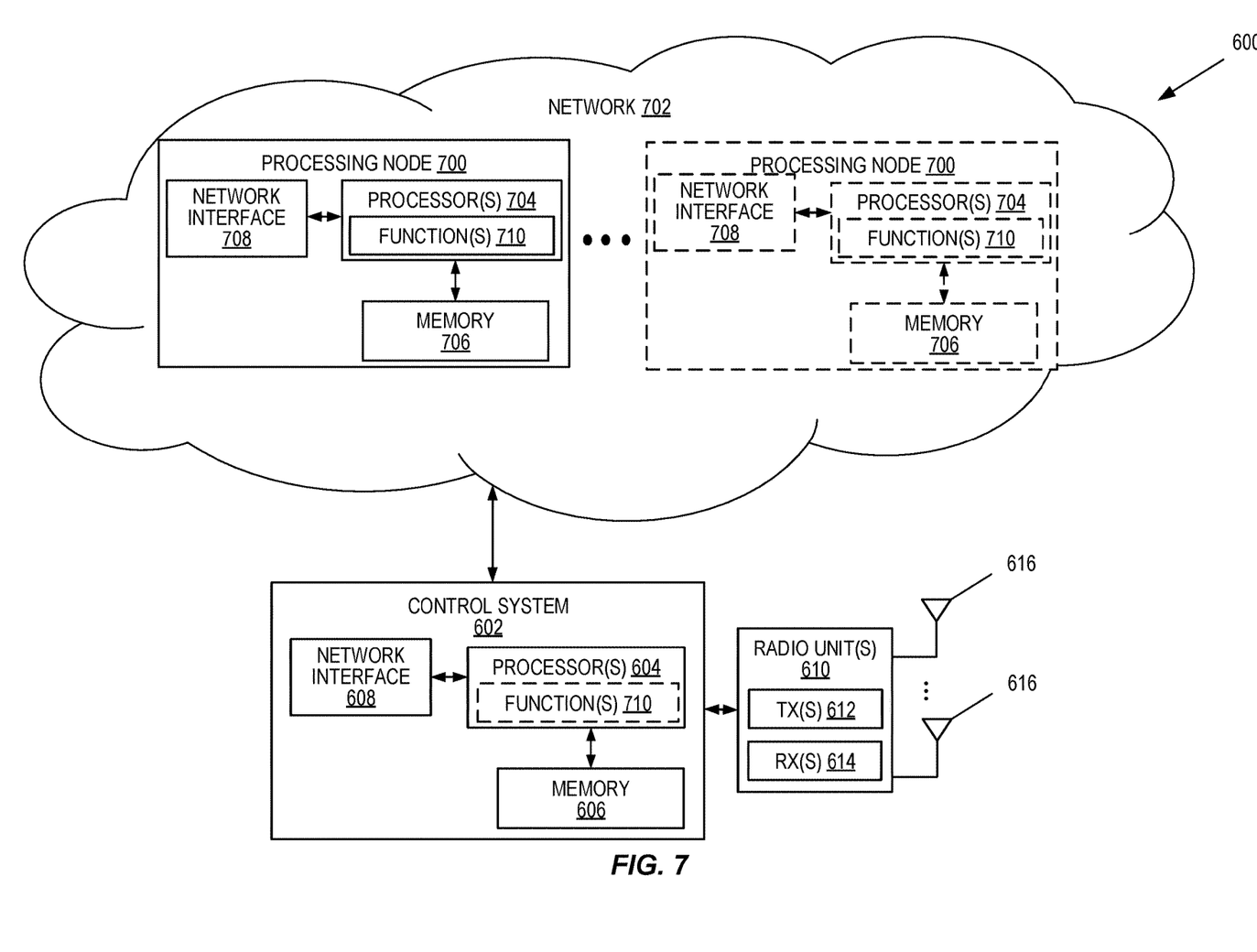
FIG. 7 is a schematic block diagram that illustrates a virtualized embodiment of the node 600 according to some embodiments of the present disclosure.

FIG. 7

FIG. 7 is a schematic block diagram that illustrates a virtualized embodiment of the node 600 according to some embodiments of the present disclosure. This discussion is equally applicable to other types of network nodes. Further, other types of network nodes may have similar virtualized architectures.

As used herein, a "virtualized" node is an implementation of the node 600 in which at least a portion of the functionality of the node 600 is implemented as a virtual component(s) (e.g., via a virtual machine(s) executing on a physical processing node(s) in a network(s)). As illustrated, in this example, the node 600 includes the control system 602 that includes the one or more processors 604 (e.g., CPUs, ASICs, FPGAs, and/or the like), the memory 606, and the network interface 608 The control system 602 is connected to one or more processing nodes 700 coupled to or included as part of a network(s) 702 via the network interface 608. Each processing node 700 includes one or more processors 704 (e.g., CPUs, ASICs, FPGAs, and/or the like), memory 706, and a network interface 708.

In this example, functions 710 of the node 600 described herein are implemented at the one or more processing nodes 700 or distributed across the control system 602 and the one or more processing nodes 700 in any desired manner. In some particular embodiments, some or all of the functions 710 of the node 600 described herein are implemented as virtual components executed by one or more virtual machines implemented in a virtual environment(s) hosted by the processing node(s) 700. As will be appreciated by one of ordinary skill in the art, additional signaling or communication between the processing node(s) 700 and the control system 602 is used in order to carry out at least some of the desired functions 710. Notably, in some embodiments, the control system 602 may not be included, in which case the radio unit(s) 610 communicate directly with the processing node(s) 700 via an appropriate network interface(s).

In some embodiments, a computer program including instructions which, when executed by at least one processor, causes the at least one processor to carry out the functionality of node 600 or a node (e.g., a processing node 700) implementing one or more of the functions 710 of the node 600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
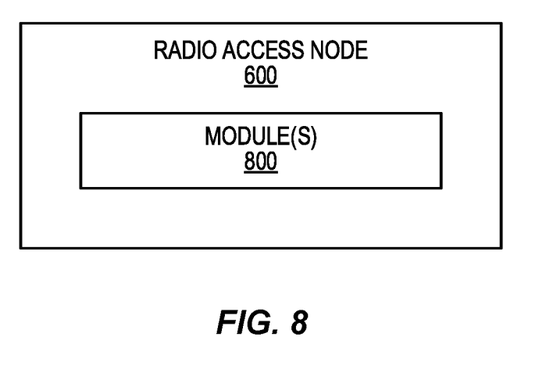
FIG. 8 is a schematic block diagram of the node 600 according to some other embodiments of the present disclosure.

FIG. 8

FIG. 8 is a schematic block diagram of the node 600 according to some other embodiments of the present disclosure. The node 600 includes one or more modules 800, each of which is implemented in software. The module(s) 800 provide the functionality of the node 600 described herein. This discussion is equally applicable to the processing node 700 of FIG. 7 where the modules 800 may be implemented at one of the processing nodes 700 or distributed across multiple processing nodes 700 and/or distributed across the processing node(s) 700 and the control system 602.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some Embodiments Described Above May Be Summarized in the Following Manner

1. A method performed by a first node (420) implementing a first network function, NF, in a visited network (VPLMN) for communicating with a third node (430) implementing a second NF in a home network (HPLMN), the method comprises:
   determining (400) that the third node should be communicated with;
   sending (402) towards a second node (440) implementing a Security Edge Protection Proxy, SEPP in the visited network, a request for a telescopic Fully Qualified Domain Name, FQDN, for the third node in the home network to be used by the first node in the visited network to communicate with the third node in the home network, which request comprises a FQDN of the third node in the home network;
   receiving (406), from the second node, a telescopic FQDN for the third node wherein the FQDN for the third node in the home network is flattened to a single label to be used by the first node to communicate with the third node.
2. The method of embodiment 1 further comprising: communicating (408, 508) with the third node in the home network via the second node in the visited network using the received telescopic FQDN for the third node wherein the FQDN for the third node in the home network is flattened to a single label.
3. The method of any one of embodiment 1-2 further comprising: communicating (408) with the third node in the home network by sending to the second node in the visited network a service request comprising the received telescopic FQDN for the third node.
4. The method of embodiment 3 wherein the service request is any one of: a discovery request, Oauth2 Access Token Request or a subscription request.
5. The method of any one of embodiment 1-4, wherein one or more of the following: the first node implements a visited NRF; the second node implements a visited SEPP; and the third node implements a home NRF.
6. The method of any one of embodiment 1-5, wherein requesting the telescopic FQDN comprises sending a FQDN for the third node in the home network.
7. The method of any one of embodiment 1-6, wherein receiving the telescopic FQDN comprises receiving a flattened FQDN for the third node.
8. The method of any one of embodiment 2-7 further comprising: communicating with the third node by sending a service request to another node (SEPP2) using the telescopic FQDN to use to communicate with the third node.
9. A method performed by a second node (440) implementing a Security Edge Protection Proxy, SEPP, in a visited network (VPLMN) for enabling communication with a third node (430) implementing a second Network Function, NF, in a home network (HPLMN), the method comprises:
   receiving (402), from a first node (420) implementing a first NF in the visited network, a request for a telescopic Fully Qualified Domain Name, FQDN, for the third node in the home network to be used by the first node in the visited network to communicate with the third node in the home network, which request comprises a FQDN of the third node in the home network; and
   transmitting (406), to the first node, a telescopic FQDN for the third node wherein the FQDN for the third node in the home network is flattened to a single label to be used by the first node to communicate with the third node.
10. The method of embodiment 9, wherein one or more of the following: the first node implements a visited NRF; the second node implements a visited SEPP; and the third node implements a home NRF.
11. The method of any one of embodiment 9-10, wherein receiving the request for the telescopic FQDN comprises receiving a FQDN for the third node in the home network.
12. The method of any one of embodiment 9-11, wherein transmitting the telescopic FQDN comprises transmitting a flattened FQDN for the third node.
13. The method of any one of embodiment 9-12, wherein transmitting the telescopic FQDN comprises transmitting the telescopic FQDN for the third node wherein the FQDN for the third node in the home network is flattened to a single label.
14. The method of any one of embodiment 9-13 further comprising: receiving (408) a service request from the first node, which service request comprises the received telescopic FQDN for communicating on behalf of the first node with the third node using the telescopic FQDN.
15. A first node (420) implementing a first network function, NF, in a visited network (VPLMN) for communicating with a third node (430) implementing a second NF in a home network (HPLMN), the first node comprising:

processing circuitry configured to perform the steps of any one of embodiment 1-8.
16. A second node (440) implementing a Security Edge Protection Proxy, SEPP, in a visited network (VPLMN) for enabling communication with a third node (430) implementing a second Network Function, NF, in a home network (HPLMN), the second node comprising:
processing circuitry configured to perform the steps of any one of embodiment 9-14.

Some Further Embodiments Described Above May Be Summarized in the Following Manner Group A Embodiments 1. A method performed by a first node (420) implementing a first network function, NF, in a visited network (VPLMN) for communicating with a third node (430) implementing a second NF in a home network (HPLMN), the method comprises:
determining (400) that the third node should be communicated with;
requesting (402), from a second node (440) implementing a Security Edge Protection Proxy, SEPP in the visited network, a telescopic Fully Qualified Domain Name, FQDN, for the third node in the home network to be used by the first node in the visited network to communicate with the third node;
receiving (406), from the second node, a telescopic FQDN for the third node, to be used by the first node to communicate with the third node.
2. The method of the previous embodiment further comprising: communicating (408) with the third node in the home network via the second node in the visited network using the received telescopic FQDN for the third node.
3. The method of any one of embodiment 1-2 further comprising: communicating (408) with the third node in the home network by sending to the second node in the visited network a service request comprising the received telescopic FQDN for the third node.
4. The method of embodiment 3 wherein the service request is any one of: a discovery request, Oauth2 Access Token Request or a subscription request.
5. The method of any one of the previous embodiments wherein one or more of the following: the first node implements a visited NRF; the second node implements a visited SEPP; and the third node implements a home NRF.
6. The method of any of the previous embodiments wherein requesting the telescopic FQDN comprises sending a FQDN for the third node in the home network.
7. The method of any of the previous embodiments wherein receiving the telescopic FQDN comprises receiving a flattened FQDN for the third node.
8. The method of any of the previous embodiments wherein receiving the telescopic FQDN comprises receiving the telescopic FQDN wherein the FQDN for the third node in the home network is flattened to a single label.
9. The method of any one of embodiment 2-7 further comprising:
communicating with the third node by sending a service request to another node (SEPP2) using the telescopic FQDN to use to communicate with the third node.

Group B Embodiments

10. A method performed by a second node (440) implementing a Security Edge Protection Proxy, SEPP, in a visited network (VPLMN) for enabling communication with a third node (430) implementing a second Network Function, NF, in a home network (HPLMN), the method comprises:
receiving (402), from a first node (420) implementing a first NF in the visited network, a request for a telescopic Fully Qualified Domain Name, FQDN, for the third node in the home network to be used by the first node in the visited network to communicate with the third node; and
transmitting (406), to the first node, a telescopic FQDN for the third node, to use to communicate with the third node in the home network.
11. The method of embodiment 10, wherein one or more of the following: the first node implements a visited NRF; the second node implements a visited SEPP; and the third node implements a home NRF.
12. The method of any one of embodiment 10-11, wherein receiving the request for the telescopic FQDN to use to communicate with the third node comprises receiving a FQDN for the third node in the home network.
13. The method of any one of embodiment 10-12, wherein transmitting the telescopic FQDN to use to communicate with the third node comprises transmitting a flattened FQDN for the third node.
14. The method of any one of embodiment 10-13, wherein transmitting the telescopic FQDN to use to communicate with the third node comprises transmitting the telescopic FQDN for the third node wherein the FQDN for the third node in the home network is flattened to a single label.
15. The method of any one of embodiment 10-14 further comprising: receiving (408) a service request from the first node, which service request comprises the received telescopic FQDN for communicating on behalf of the first node with the third node using the telescopic FQDN.

Group C Embodiments

16. A first node (420) implementing a first network function, NF, in a visited network (VPLMN) for communicating with a third node (430) implementing a second NF in a home network (HPLMN), the first node comprising:
processing circuitry configured to perform any of the steps of any of the Group A embodiments.
17. A second node (440) implementing a Security Edge Protection Proxy, SEPP, in a visited network (VPLMN) for enabling communication with a third node (430) implementing a second Network Function, NF, in a home network (HPLMN), the second node comprising:
processing circuitry configured to perform any of the steps of any of the Group B embodiments.

While various embodiments of the present disclosure are described herein, it should be understood that they have been presented by way of example only, and not limitation. Thus, the breadth and scope of the present disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes or methods described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a first node implementing a first network function (NF) in a visited network (VPLMN) for communicating with a third node implementing a second NF in a home network (HPLMN), the method comprises:
   determining that the third node should be communicated with;
   sending towards a second node implementing a Security Edge Protection Proxy (SEPP) in the visited network, a request fora telescopic Fully Qualified Domain Name (FQDN) for the third node in the home network to be used by the first node in the visited network to communicate with the third node in the home network, the request comprises a FQDN of the third node in the home network;
   receiving, from the second node, the telescopic FQDN for the third node wherein the FQDN for the third node in the home network is flattened to a single label to be used by the first node to communicate with the third node; and
   communicating with the third node in the home network via the second node in the visited network using the received telescopic FQDN for the third node wherein the FQDN for the third node in the home network is flattened to a single label.

2. The method of claim 1 further comprising: communicating with the third node in the home network by sending to the second node in the visited network a service request comprising the received telescopic FQDN for the third node.

3. The method of claim 2 wherein the service request is any one of: a discovery request, Oauth2 Access Token Request or a subscription request.

4. The method of claim 1, further comprising one or more of the following: the first node implements a visited Network Repository Function (NRF); the second node implements a visited SEPP; and the third node implements a home NRF.

5. The method of claim 1 further comprising: communicating with the third node by sending a service request to another node (SEPP2) using the telescopic FQDN to communicate with the third node.

6. A method performed by a second node implementing a Security Edge Protection Proxy (SEPP) in a visited network (VPLMN) for enabling communication with a third node implementing a second Network Function (NF) in a home network (HPLMN), the method comprises:
   receiving, from a first node implementing a first NF in the visited network, a request for a telescopic Fully Qualified Domain Name (FQDN) for the third node in the home network to be used by the first node in the visited network to communicate with the third node in the home network, the request comprises a FQDN of the third node in the home network;
   generating the telescopic FQDN;
   transmitting, to the first node, the telescopic FQDN for the third node wherein the FQDN for the third node in the home network is flattened to a single label to be used by the first node to communicate with the third node; and
   enabling communication with the third node in the home network using the telescopic FQDN for the third node wherein the FQDN for the third node in the home network is flattened to a single label.

7. The method of claim 6, further comprising one or more of the following: the first node implements a visited Network Repository Function (NRF); the second node implements a visited SEPP; and the third node implements a home NRF.

8. The method of claim 6 further comprising: receiving the service request from the first node, which service request comprises the received telescopic FQDN for communicating on behalf of the first node with the third node using the telescopic FQDN.

9. A first node implementing a first network function (NF) in a visited network (VPLMN) for communicating with a third node implementing a second NF in a home network (HPLMN), the first node comprising:
   processing circuitry configured to:
      determine that the third node should be communicated with;
      send towards a second node implementing a Security Edge Protection Proxy (SEPP) in the visited network, a request for a telescopic Fully Qualified Domain Name (FQDN) for the third node in the home network to be used by the first node in the visited network to communicate with the third node in the home network, the request comprises a FQDN of the third node in the home network;
      receive, from the second node, the telescopic FQDN for the third node wherein the FQDN for the third node in the home network is flattened to a single label to be used by the first node to communicate with the third node; and
      communicate with the third node in the home network via the second node in the visited network using the received telescopic FQDN for the third node wherein the FQDN for the third node in the home network is flattened to a single label.

10. A second node implementing a Security Edge Protection Proxy (SEPP), in a visited network (VPLMN) for enabling communication with a third node implementing a second Network Function, NF, in a home network (HPLMN), the second node comprising:
   processing circuitry configured to:
      receive, from a first node implementing a first NF in the visited network, a request for a telescopic Fully Qualified Domain Name, FQDN, for the third node in the home network to be used by the first node in the visited network to communicate with the third node in the home network, which request comprises a FQDN of the third node in the home network;
      generate a telescopic FQDN;
      transmit, to the first node, the telescopic FQDN for the third node wherein the FQDN for the third node in the home network is flattened to a single label to be used by the first node to communicate with the third node; and
      enable communication with the third node in the home network using the telescopic FQDN for the third node wherein the FQDN for the third node in the home network is flattened to a single label.

* * * * *

UNITED STATES PATENT AND TRADEMARK OFFICE
CERTIFICATE OF CORRECTION

PATENT NO. : 12,010,103 B2
APPLICATION NO. : 17/602112
DATED : June 11, 2024
INVENTOR(S) : de-Gregorio-Rodriguez et al.

It is certified that error appears in the above-identified patent and that said Letters Patent is hereby corrected as shown below:

In the Specification

In Column 1, Line 45, delete "https://udm1.home-operatorcom/nudm-sdm/v1/ . . ." and insert -- https://udm1.home-operator.com/nudm-sdm/v1/ . . . --, therefor.

In Column 2, Line 9, delete ".sepp.visited-operator.com" and insert -- *.sepp.visited-operator.com --, therefor.

In Column 3, Line 33, delete "https://sepp.visited-operatorcom/" and insert -- https://sepp.visited-operator.com/ --, therefor.

In Column 3, Line 40, delete "visited-operatorcom"}" and insert -- visited-operator.com"} --, therefor.

In Column 3, Line 47, delete "https://sepp.visited-operatorcom/" and insert -- https://sepp.visited-operator.com/ --, therefor.

In Column 5, Line 37, delete "nrf.home-operatorcom" and insert -- nrf.home-operator.com --, therefor.

In Column 9, Line 42, delete "operators" and insert -- operator's --, therefor.

In Column 9, Line 44, delete "users" and insert -- user's --, therefor.

In Column 10, Line 45, delete "https://sepp.visited-operatorcom/" and insert -- https://sepp.visited-operator.com/ --, therefor.

In the Claims

In Column 17, Line 17, in Claim 1, delete "fora" and insert -- for a --, therefor.

Signed and Sealed this
Seventeenth Day of September, 2024

Katherine Kelly Vidal
*Director of the United States Patent and Trademark Office*